(No Model.)
G. F. CASE.
FEED MECHANISM FOR ROCK DRILLS.
No. 335,891. Patented Feb. 9, 1886.
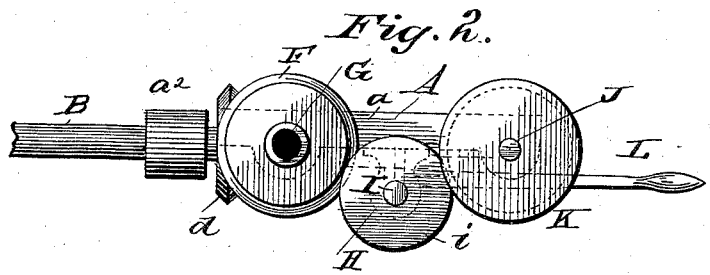
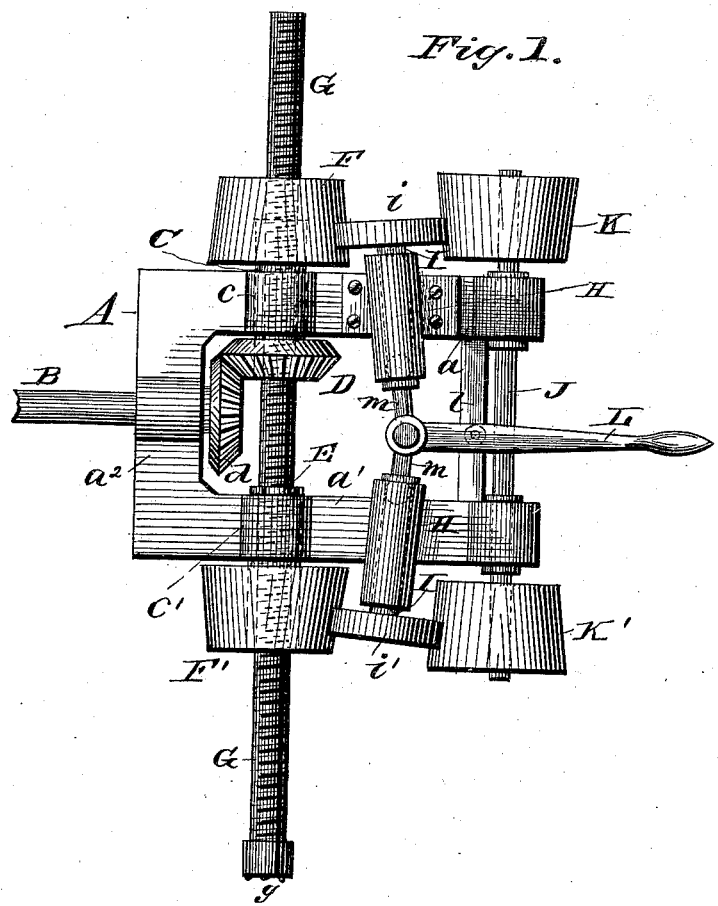

UNITED STATES PATENT OFFICE.

GEORGE F. CASE, OF DENVER, COLORADO.

FEED MECHANISM FOR ROCK-DRILLS.

SPECIFICATION forming part of Letters Patent No. 335,891, dated February 9, 1886.

Application filed September 15, 1885. Serial No. 177,193. (No model.)

*To all whom it may concern:*

Be it known that I, GEORGE F. CASE, of Denver, in the county of Arapahoe and State of Colorado, have invented certain new and useful Improvements in Feed Mechanism for Rock-Drills; and I do hereby declare the following to be a full, clear, and exact description of the invention, such as will enable others skilled in the art to which it pertains to make and use the same.

My invention relates to feed mechanism for rock-drills, the object being to provide a drill-rod with differential feed mechanism.

The invention consists in combining with a supporting-frame and a drill-rod differential cone-gearing, as hereinafter fully described, and pointed out in the claims.

In the accompanying drawings, Figure 1 illustrates a side elevation of my improved feed mechanism, and Fig. 2 is a plan view of the same.

A represents the supporting-frame of the device, consisting of parallel top and bottom bars, $a$ $a'$, and cross-bar $a^2$. The cross-bar $a^2$ is provided with a suitable bearing for the power-shaft B. The bars $a$ and $a'$ are each formed with a bearing, (in the same vertical plane,) $c$ and $c'$. Within the bearing $c$ is arranged a sleeve, C, provided at its lower end with a bevel gear-wheel, D, adapted to mesh with a similar wheel, $d$, mounted on the end of the shaft B. Within the bearing $c'$ is arranged a nut, E. Upon the upper end of the sleeve C is rigidly secured a cone-wheel, F, tapering from bottom to top, and upon the lower end of the nut E is rigidly secured a cone-wheel, F', tapering from top to bottom.

The threaded drill-rod G, provided at its lower end with a diamond drill-bit, $g$, extends through the nut E and sleeve C, to which latter it is splined.

H H represent sleeve-bearings arranged to slide in recesses formed on the upper and lower bars of the frame A. Within these bearings are mounted shafts I I, provided at opposite extremities with friction-wheels $i$ $i'$.

J represents a shaft supported in bearings of the frame parallel to the drill-rod G. Upon the ends of this shaft are mounted oppositely-tapering cone-wheels K K'. The latter are arranged practically parallel to the cone-wheels F and F', so that the lower wheels, F and K, and the upper wheels, F' and K', form two sets of wheels, the two wheels of each set being oppositely tapered, as shown, and having the friction-rollers $i$ $i'$ interposed between them.

L represents a lever fulcrumed on a bar, $l$, secured upon the frame, and connected by links $m$ $m$ to the sliding bearings H H, to permit the latter to be readily shifted.

The operation of the mechanism thus described may be explained as follows: The nut E, its cone-wheel F', and the drill-rod are driven by the gearing $d$ D, and said wheel F', by the frictional contact of the roller $i'$, revolves the cone-wheel K', its shaft J, and wheel K. The wheel F and its sleeve are driven by the roller $i$, thus revolving in contact with the drill-rod. The speed of the cone-wheels in revolving is regulated by the friction-rollers $i$ $i'$, whose positions are varied by the lever L.

It is evident that by properly adjusting the rollers $i$ $i'$ the cone-wheel F' and its nut E may be made to revolve at the same speed as the drill-rod, or faster or slower, as may be desired, so that the drill may be fed forward, or its downward movement entirely stopped, while it still revolves; or it may be withdrawn or given an upward feed. In short, the speed and direction of the drill-rod are governed entirely by the lever L.

The spline-and-groove connection of the drill-rod and sleeve C insures the revolution of the rod with the sleeve, but permits said rod to freely move longitudinally within the sleeve.

Having fully described my invention, what I claim as new, and desire to secure by Letters Patent, is—

1. The combination, with a supporting-frame and the drill-rod, of a revolving nut and differential friction feed mechanism, substantially as set forth.

2. The combination, with the supporting-frame and drill-rod, of a revolving sleeve and a revolving nut supported in bearings of said frame, cone-gearing arranged upon said sleeve and nut, and shifting rollers and the auxiliary cone-wheels for varying the feed of the drill-rod, substantially as set forth.

3. The combination, with the supporting-frame and the drill-rod, of a revolving sleeve and revolving nut, each provided with a cone-wheel, and said sleeve being geared to a driving-shaft, a shaft arranged parallel to the drill-rod, and cone-wheels mounted thereon, friction-rollers mounted upon independent shafts between the two sets of cone-wheels, and a lever for shifting said friction-rollers, substantially as set forth.

4. The combination, with the supporting-frame, the drill-rod, and cone-gearing, of sliding bearings for the friction-rollers, said bearings being secured by a link-connection to a shifting-lever, substantially as set forth.

In testimony whereof I have signed this specification in the presence of two subscribing witnesses.

GEORGE F. CASE.

Witnesses:
SUSAN DAVIS,
IDA R. CASE.